United States Patent [19]

Bertram et al.

[11] 4,042,716
[45] Aug. 16, 1977

[54] PRESERVATIVE FOR FODDER, MIXED FODDER AND SILAGE

[75] Inventors: Heidrun Bertram, Hanau; Rudolf Fahnenstich, Mombris; Helmut Junkermann, Frankfurt; Gerhard Pohl; Herbert Tanner, both of Hanau, all of Germany

[73] Assignee: Deutsche Gold- und Silber-Scheideanstalt vormals Roessler, Frankfurt, Germany

[21] Appl. No.: 559,493

[22] Filed: Mar. 18, 1975

Related U.S. Application Data

[63] Continuation-in-part of Ser. No. 558,686, March 17, 1975, abandoned.

[30] Foreign Application Priority Data

Mar. 16, 1974 Germany .............................. 2412801

[51] Int. Cl.² .......................... A23L 3/34; A23B 7/14; A23K 3/00
[52] U.S. Cl. ................................... 426/335; 426/635; 426/807; 424/307; 424/314; 424/317; 426/532

[58] Field of Search ................... 426/9, 335, 532, 654, 426/635, 636, 61, 807, 321, 49, 53, 54; 424/307, 314, 317

[56] References Cited

U.S. PATENT DOCUMENTS

| 2,862,022 | 11/1958 | Cook ................................... 424/314 |
| 2,910,368 | 10/1959 | Melnick ............................... 426/532 |
| 3,465,720 | 9/1969 | Miyazawa ................................ 119/6 |

FOREIGN PATENT DOCUMENTS

| 617,667 | 4/1961 | Canada ................................. 426/335 |
| 2,019,972 | 11/1971 | Germany ............................. 426/321 |
| 46-7539 | 12/1971 | Japan |
| 46-37845 | 11/1971 | Japan ................................... 426/807 |

OTHER PUBLICATIONS

Chem. Abs. 150590e vol. 75, 1971.
Translation of Japanese Patent 46-7539 Matsuda.
Feeds and Feeding-Morrison 22nd Ed. Ithaca N. Y. Morrison Pub. Co. 1957, pp. 278, 320, 321.

*Primary Examiner*—Hiram H. Bernstein
*Attorney, Agent, or Firm*—Cushman, Darby & Cushman

[57] ABSTRACT

Fodder, mixed fodder and silage are preserved with acrylic acid, methacrylic acid or esters or salts of such acids.

24 Claims, No Drawings

PRESERVATIVE FOR FODDER, MIXED FODDER AND SILAGE

This application is a continuation-in-part of application Ser. No. 558,686 filed Mar. 17, 1975, and now abandoned.

The present invention is directed to a preservative for fodder, mixed fodder and silage against the undesired action of microorganisms such as bacteria, yeast and mold fungi.

The growth and activity of microorganisms as a rule is favored and the storage stability of fodder, mixed fodder and silage is reduced the greater the water content thereof. Generally only fodder and mixed fodder whose water content is below 12% is not injured by microorganisms. Fodder and mixed fodder having water contents up to about 16% are of limited storage stability while those with greater water contents are very quickly spoiled. For a long time therefore it has been customary to dry fodder and mixed fodder for preserving purposes. However, drying is only possible to a limited extent and is not possible in all cases. A natural drying besides is dependent on the weather, a synthetic drying because of the high energy requirements is often uneconomical.

In the case of silage not all microorganisms should be removed by the preservation. There should only be suppressed the growth of those which bring about undesired processes, such as the formation of butyric acid, not, however, the growth of those which cause the necessary fermentation of the silage to form lactic acid.

Typical types of silage which can be used in the invention disclosed hereinafter are silages based on fermented grass, alfalfa, vetch grains, clover, green corn, beets and potatoes.

It is known to add chemicals which have bactericide and/or fungicide action as preservatives for fodders, mixed fodders or silages. For example, formaldehyde and hexamethylenetetramine serve as preservatives. There also have been added organic acids such as formic acid, propionic acid, lactic acid, sorbic acid, benzoic acid, salicylic acid, tartaric acid, citric acid and sulfosalicylic acid, in a given case in the form of their esters and salts. The known preservatives act in part only on certain types of undesired microorganisms or generally have a slight action.

It has now been found that acrylic acid and methacrylic acid as well as their salts and esters are outstandingly suited as preservatives for fodder, mixed fodder and silages. These unsaturated acids and their derivatives are unexpectedly strong bactericides and fungicides. Although these acids are neither in their acidity nor in their structure basically different from the acids previously used as preservatives, their effect is far greater.

According to the invention acrylic acid and methacrylic acid as well as their esters and salts, in a given case mixtures thereof, are used as preservatives. As esters there are especially employed esters with ethylene glycol, 1,2-propylene glycol, glycerine, aliphatic alkanols with straight or branched chains with 1 to 8 carbon atoms, preferably with 1 to 4 carbon atoms, most especially ethanol. Such esters include, for example, ethyl acrylate, ethyl methacrylate, methyl acrylate, methyl methacrylate, propyl acrylate, propyl methacrylate, isopropyl acrylate, isopropyl methacrylate, butyl acrylate, butyl methacrylate, propylene glycol dimethacrylate, hydroxyethyl acrylate, hydroxyethyl methacrylate, hydroxypropyl acrylate, ethylene glycol diacrylate, ethylene glycol dimethacrylate, propylene glycol diacrylate, hydroxypropyl methacrylate, glycerine acrylate and glycerine methacrylate. In the salts the basic component is either an organic base, preferably a nitrogen base, as for example hexamethylenetetramine or a metal preferably an alkali or alkaline earth metal, especially sodium, potassium or calcium. Examples of salts are sodium acrylate, sodium methacrylate, potassium acrylate, potassium methacrylate, calcium acrylate, calcium methacrylate and the hexamethylenetetramine salts of acrylic and methacrylic acids. The acids, esters or salts, in a given case can be present in the form of up to 50% as a polymer, e.g., sodium polyacrylate, polymethyl methacrylate or the like.

The preservatives of the invention are suitable for use with all the conventional fodders, mixed fodders and silages of plant or animal origin. These include for example grains such as corn and wheat, the crushed grain obtained as byproduct in the removal of oil from oily fruits and oily seeds such as soybeans, cotton and rape, hoed vegetables such as potatoes and beets; fish and meat meal; silage, including for example from corn and beets; mixtures of such materials, especially mixed fodders, as customary, including for example for poultry, swine and ruminants, e.g., cattle and sheep.

The preservatives provided by the invention can generally be used in any form. For example they can be mixed as solids with fodder, mixed fodder or silage, or the preservatives can be sprayed as liquids on the fodder, mixed fodder or silage. In many cases it is suitable to add the materials in the form of a solution. As solvents for the acids and salts it is generally convenient to use water. As solvents for the esters there are suitably used alkanols, e.g., glycols such as 1,2-propylene glycol, and ethylene glycol, or glycerine or esters such as 1,2-propylene glycol dipropionate, 1,2-propylene glycol diacetate, ethylene glycol diacetate, ethylene glycol dipropionate, glyceryl triacetate (triacetin), glycerol diacetate, glyceryl tripropionate, glyceryl monoacetate, etc.

In a given case mixtures of such liquids can be used. Furthermore it is suitable to add to the materials, whether they be in the solid or liquid phase, inert solids as for example, silica, kieselguhr, Bolus alba or polymers of acrylic acid and methacrylic acid or salts or esters of such polymer acids. In a given case an addition of this type of material can change a substance present as a liquid into a fluid solid. In the preparation of mixed fodders the preservative can be added with one of the mixed fodder components, for example with the usual mineral components.

The amounts of preservative of the invention to be used in individual cases are adjusted essentially according to the type of fodder or mixed fodder to be preserved, especially according to their water content, or according to the type of silage. Generally it is suitable to add to the fodder, mixed fodder or silage preservative in an amount to provide about 0.01 to 2.0 weight percent, preferably about 0.02 to 0.08 weight percent of preservative based on the fodder, mixed fodder or silage.

Unless otherwise indicated all parts and percentages are by weight.

EXAMPLE 1

There were mixed with 300 grams samples of commercial wheat groats, additives as follows:

Sample 1 had no additive, moisture content 10%.

Sample 2 had water as an additive, moisture content 18%.

Sample 3 had water as an additive, moisture content 18% and also contained a. 0.2 weight percent propionic acid
b. 0.4 weight percent propionic acid.

Sample 4 had water as an additive, moisture content 18% and also contained a. 0.02 weight percent acrylic acid
b. 0.08 weight percent acrylic acid.

Sample 5 had water as an additive, moisture content 17% and also contained a. 0.1 weight percent ethyl acrylate
b. 0.1 weight percent calcium acrylate.

The samples were stored at room temperature and their content of microorganisms tested at intervals. The results are set forth in the following table:

| Sample | Number of Bacteria After 4 days | 12 days | 24 days | Number of Fungi After 4 days | 12 days | 24 days |
|---|---|---|---|---|---|---|
| 1 | 460 | 390 | 440 | 3.6 | 3.8 | 2.9 |
| 2 | 480 | 970 | 31,400 | 3.9 | 41.0 | 10,800 |
| 3(a) | 390 | 280 | 210 | 3.0 | 2.1 | 1.9 |
| 3(b) | 160 | 90 | 60 | 2.9 | 2.4 | 1.3 |
| 4(a) | 380 | 240 | 210 | 3.4 | 2.7 | 1.7 |
| 4(b) | 110 | 18 | 15 | 0.9 | 0.1 | 0.1 |
| 5(a) | 320 | 57 | 21 | 2.3 | 0.7 | 0.3 |
| 5(b) | 410 | 74 | 30 | 3.0 | 1.1 | 1.2 |

The number of bacteria and fungi is given in 1000 per grams of sample.

EXAMPLE 2

The process was the same as in Example 1 except there was used a single fodder for laying hens. This mixed fodder consisted of

| | |
|---|---|
| corn | 43% |
| wheat | 14% |
| soybean meal | 20% (45% crude protein) |
| fish meal | 1% |
| green alfalfa meal | 5% |
| fodder fat | 5% |
| calcium carbonate | 6% |
| dicalcium phosphate | 2% |
| vitamin mixture | 1% |
| meat meal | 3% |

The samples (except sample 1) were brought to an 18% moisture content by adding water. The results are given in the following table. The additives were the same as for the corresponding numbered samples in Example 1.

| Sample | Number of Bacteria After 4 days | 12 days | 24 days | Number of Fungi After 4 days | 12 days | 24 days |
|---|---|---|---|---|---|---|
| 1 | 550 | 410 | 360 | 26 | 20 | 17 |
| 2 | 490 | 980 | 14,000 | 27 | 29,000 | 87,000 |
| 3(a) | 340 | 190 | 110 | 1.7 | 0.9 | 0.6 |
| 3(b) | 170 | 80 | 40 | 1.8 | 0.4 | 0.2 |
| 4(a) | 210 | 170 | 73 | 4.8 | 1.0 | 0.8 |
| 4(b) | 80 | 13 | 5 | 1.1 | 0.1 | 0.1 |
| 5(a) | 110 | 42 | 28 | 1.2 | 0.2 | 0.1 |
| 5(b) | 150 | 80 | 40 | 1.5 | 0.4 | 0.2 |

The number of bacteria and fungi is given in 1000 per gram of sample.

EXAMPLE 3

Samples of alfalfa were silaged in gas tight closed glass vessels. In all 50 samples were prepared and they were divided into 5 groups with 10 samples each.

Group 1 without any additive.

Group 2 having added thereto 0.4 weight percent of propionic acid.

Group 3 having added thereto 0.08 weight percent of acrylic acid.

Group 4 having added thereto 0.1 weight percent of ethyl acrylate.

Group 5 having added thereto 0.1 weight percent of calcium acrylate.

The quality of the samples was determined according to FLIEG (Brockhaus, ABC der Landwirtschaft, VEB Brockhaus-Verlag, Leipzig, second edition (1962), Vol. 1, pages 442 to 443.

| Group | Number of Samples Quality According to FLIEG | | | | |
|---|---|---|---|---|---|
| | Poor | Fair | Satisfactory | Good | Very Good |
| 1 | 8 | 1 | 1 | 0 | 0 |
| 2 | 1 | 2 | 5 | 1 | 1 |
| 3 | 0 | 1 | 1 | 5 | 3 |
| 4 | 0 | 2 | 5 | 2 | 1 |
| 5 | 1 | 1 | 4 | 3 | 1 |

EXAMPLE 4

The procedure of Example 3 was followed but in group 3 there was employed 0.1 weight percent of acrylic acid and in group 4 there was employed 0.1 weight of propylene glycol diacrylate (in place of ethyl acrylate).

| Group | Number of Samples Quality According to FLIEG | | | | |
|---|---|---|---|---|---|
| | Poor | Fair | Satisfactory | Good | Very Good |
| 1 | 8 | 1 | 1 | 0 | 0 |
| 2 | 1 | 2 | 4 | 2 | 1 |
| 3 | 0 | 1 | 2 | 5 | 2 |
| 4 | 0 | 1 | 3 | 4 | 2 |
| 5 | 1 | 2 | 3 | 3 | 1 |

EXAMPLE 5

Samples of alfalfa were silaged in gas tight closed glass vessels. In all 30 samples were prepared and they were divided into 3 groups with 10 samples each.

Group 1 without additive.

Group 2 having added thereto 0.2 weight percent of propionic acid.

Group 3 having added thereto 0.2 weight percent of hexamethylenetetramine acrylate.

| Group | Number of Samples Quality According to FLIEG | | | | |
|---|---|---|---|---|---|
| | Poor | Fair | Satisfactory | Good | Very Good |
| 1 | 8 | 1 | 1 | 0 | 0 |
| 2 | 1 | 2 | 5 | 1 | 1 |
| 3 | 0 | 0 | 3 | 6 | 1 |

Mixtures of the preservatives of the invention can be used.

The composition can comprise, consist essentially of or consist of the materials set forth.

The salts and esters employed of course should be non-toxic in the amounts employed.

What is claimed is:

1. Silage containing acrylic acid, methacrylic acid or an ester or salt of acrylic acid or methacrylic acid in an amount effective to preserve the silage.

2. Silage according to claim 1 containing as a preservative acrylic acid, methacrylic acid, a 1 to 8 carbon atom alkyl ester of acrylic acid, a 1 to 8 carbon atom alkyl ester of methacrylic acid, an ethylene glycol ester of acrylic acid or methacrylic acid, a 1,2-propylene glycol ester of acrylic acid or methacrylic acid, a salt of acrylic acid with an alkali metal, an alkaline earth metal or an organic base or a salt of methacrylic acid with an alkali metal, an alkaline earth metal or an organic base.

3. Silage according to claim 2 wherein the preservative is acrylic acid or methacrylic acid.

4. Silage according to claim 3 wherein the preservative is acrylic acid.

5. Silage according to claim 1 wherein the preservative is an ester of acrylic acid or methacrylic acid.

6. Silage according to claim 5 wherein the ester is an alkyl ester containing 1 to 4 carbon atoms in the alkyl group.

7. Silage according to claim 6 wherein the alkyl group is ethyl.

8. Silage according to claim 7 wherein the ester is ethyl acrylate.

9. Silage according to claim 5 wherein the ester is an ester of ethylene glycol.

10. Silage according to claim 9 wherein the ester is ethylene glycol diacrylate or ethylene glycol dimethacrylate.

11. Silage according to claim 5 wherein the ester is an ester of 1,2-propylene glycol.

12. Silage according to claim 11 wherein the ester is propylene glycol diacrylate or propylene glycol dimethacrylate.

13. Silage according to claim 5 wherein the ester is an ester of glycerine.

14. Silage according to claim 13 wherein the ester is glycerine triacrylate or glycerine trimethacrylate.

15. Silage according to claim 1 wherein the preservative is a salt of acrylic acid or methacrylic acid.

16. Silage according to claim 15 wherein the salt is a sodium or potassium salt.

17. Silage according to claim 15 wherein the salt is a calcium salt.

18. Silage according to claim 15 wherein the salt is a hexamethylene tetramine salt.

19. Silage according to claim 2 wherein the preservative is acrylic acid or an ester or salt of acrylic acid.

20. Silage according to claim 2 wherein there is present a polymer of (1) said acrylic acid, (2) said methacrylic, (3) said salt or (4) said ester.

21. Silage according to claim 2 wherein the preservative is employed in an amount of 0.01 to 2.0 weight percent.

22. Silage according to claim 21 wherein the preservative is employed in an amount of 0.02 to 0.08 weight percent.

23. Silage according to claim 21 wherein the preservative is acrylic acid, ethyl acrylate, calcium acrylate or propylene glycol diacrylate.

24. Fodder, mixed fodder or silage containing alfalfa as a constituent thereof and also containing acrylic acid, methacrylic acid or an ester or salt of acrylic acid or methacrylic acid in an amount effective to preserve said alfalfa containing fodder, mixed fodder or silage.

* * * * *